US012804784B2

(12) United States Patent
Luo et al.

(10) Patent No.: US 12,804,784 B2
(45) Date of Patent: Nov. 17, 2026

(54) ILLUMINATION DRIVER CIRCUIT COMPATIBLE WITH ELECTRONIC BALLAST AND MAINS SUPPLY, AND ILLUMINATION DEVICE

(71) Applicant: Joulwatt Technology Co., Ltd., Hangzhou (CN)

(72) Inventors: Kunhui Luo, Hangzhou (CN); Guoqiang Liu, Hangzhou (CN); Wanyue He, Hangzhou (CN)

(73) Assignee: Joulwatt Technology Co., Ltd., Hangzhou (CN)

( * ) Notice: Subject to any disclaimer, the term of this patent is extended or adjusted under 35 U.S.C. 154(b) by 12 days.

(21) Appl. No.: 19/054,932

(22) Filed: Feb. 17, 2025

(65) Prior Publication Data

US 2025/0301545 A1 Sep. 25, 2025

(30) Foreign Application Priority Data

Mar. 19, 2024 (CN) ......................... 202410312021.0

(51) Int. Cl.
*H05B 45/345* (2020.01)
*H05B 45/37* (2020.01)
*H05B 45/50* (2022.01)
*H05B 47/17* (2020.01)

(52) U.S. Cl.
CPC ........... *H05B 45/345* (2020.01); *H05B 45/37* (2020.01); *H05B 45/50* (2020.01); *H05B 47/17* (2020.01)

(58) Field of Classification Search
CPC ...... H05B 45/30; H05B 45/345; H05B 45/36; H05B 45/37; H05B 45/50; H05B 47/17; H05B 47/26; Y02B 20/30
See application file for complete search history.

(56) References Cited

U.S. PATENT DOCUMENTS

2021/0212180 A1* 7/2021 Sun ...................... H05B 45/345
2025/0334234 A1* 10/2025 Xiong ...................... F21K 9/278
2025/0358916 A1* 11/2025 Roy ...................... H05B 45/59

* cited by examiner

*Primary Examiner* — Raymond R Chai
(74) *Attorney, Agent, or Firm* — Bayramoglu Law Offices LLC

(57) ABSTRACT

An illumination driver circuit compatible with an electronic ballast and a mains supply are provided. By detecting a frequency of a signal of an input terminal, a constant current controller recognizes the mains supply and the electronic ballast. When the input terminal is an input of the mains supply, the constant current controller enables a detection result of a leakage protection module, and according to the detection result, the constant current controller controls a power switching transistor to work in an off mode or an on/off mode. When the input terminal is an input of the electronic ballast, the constant current controller controls the power switching transistor to work in a through mode. Through the illumination driver circuit, the detection of the electronic ballast and the detection of the leakage protection module can be performed at the same time.

18 Claims, 5 Drawing Sheets

ILLUMINATION DRIVER CIRCUIT COMPATIBLE WITH ELECTRONIC BALLAST AND MAINS SUPPLY, AND ILLUMINATION DEVICE

CROSS REFERENCE TO THE RELATED APPLICATIONS

This application is based upon and claims priority to Chinese patent application No. 202410312021.0, filed on Mar. 19, 2024, the entire contents of which are incorporated herein by reference.

TECHNICAL FIELD

The present disclosure relates to the technical field of illumination control, and more specifically, to an illumination driver circuit compatible with an electronic ballast and a mains supply, and an illumination device.

BACKGROUND TECHNOLOGY

With extensive use of light-emitting diode (LED) lamps, higher requirements are imposed on control of an LED tube. Instead of conventional fluorescent lamps, the LED lamps are required to adapt to an electronic ballast circuit and an alternating current (AC) mains supply. Hence, a driver circuit of the LED tube is not only compatible with the electronic ballast (labeled as TYPEA) and the mains supply (labeled as TYPEB), but also can provide the safety guarantee such as the leakage protection function in use of the mains supply.

The existing solution compatible with the electronic ballast and the mains supply is usually realized with two parts of circuits. In one part of circuits, the leakage detection circuit is configured to detect leakage, and transmit a valid enable signal to a subsequent LED driver circuit in case of no leakage. The other part of circuits is configured to detect whether an input terminal has the electronic ballast, in which an individual TYPEA detection circuit and a control switch are typically provided. The individual detection circuit is composed of a capacitor and a bridge rectifier, and configured to detect whether the electronic ballast exists. If the electronic ballast exists, the on/off of the control switch controls the electronic ballast to supply power to a load. However, the existing solution generally increases the size of the system, and makes the circuit structure complex.

Therefore, it is necessary to provide an improved technical solution to overcome the above technical problems in the prior art.

SUMMARY OF THE INVENTION

In view of this, an objective of the present disclosure is to provide an illumination driver circuit compatible with an electronic ballast and a mains supply, and an illumination device, to solve technical problems of the large size and complex structure of the illumination driver circuit in the prior art.

The present disclosure provides an illumination driver circuit compatible with an electronic ballast and a mains supply, including a leakage protection module and a constant current controller, where the constant current controller is configured to control an on-off state of a main power switching transistor; the leakage protection module is configured to detect a voltage signal of an input bus for leakage detection, and transmit an enable signal representing a leakage detection result to the constant current controller; the constant current controller is configured to detect an input signal of an input terminal to recognize the mains supply or the electronic ballast; when the constant current controller detects that the input terminal is an input of the mains supply, the constant current controller controls the main power switching transistor to work in an off mode or an on/off mode according to the detection result of the leakage protection module; and when the input terminal is an input of the electronic ballast, the constant current controller controls the main power switching transistor to work in a through mode.

Preferably, the leakage protection module is configured to output an enable signal of a high-level valid state to the constant current controller when no leakage is detected, and output an enable signal of a low-level invalid state to the constant current controller when leakage is detected.

Preferably, the constant current controller is configured to recognize, according to a frequency of the signal of the input terminal, whether the input terminal is the input of the mains supply or the input of the electronic ballast.

Preferably, the constant current controller includes a frequency detection circuit; the frequency detection circuit includes a first capacitor, a second capacitor, and a comparator circuit; the first capacitor includes one terminal connected to the input terminal, and the other terminal configured to charge the second capacitor through a rectifier diode; the comparator circuit is configured to compare a voltage magnitude of the second capacitor with a reference voltage; the reference voltage is a zero voltage or near the zero voltage; in response to the input of the mains supply, the voltage magnitude of the second capacitor is zero, and the comparator circuit outputs a comparison signal of a low-level invalid state; and in response to the input of the electronic ballast, the voltage magnitude of the second capacitor is greater than zero, and the comparator circuit outputs a comparison signal of a high-level valid state.

Preferably, the frequency detection circuit includes a discharge circuit and a clamping circuit; the discharge circuit and the clamping circuit are connected to two terminals of the second capacitor in parallel; and the clamping circuit is configured to clamp voltages at the two terminals of the second capacitor.

Preferably, the constant current controller further includes a constant current control unit; and the constant current control unit is configured to receive a current feedback signal and the enable signal of the leakage protection module, so as to generate an on-off control signal to control the main power switching transistor to work in different modes.

Preferably, when the input of the electronic ballast is recognized, the main power switching transistor is controlled by the on-off control signal to work in the through mode.

Preferably, when the input of the mains supply is recognized, and when the enable signal of the leakage protection module is a low-level invalid state, the main power switching transistor is controlled by the on-off control signal to work in the off mode; and when the enable signal of the leakage protection module is a high-level valid state, the constant current control unit generates another on-off control signal according to the current feedback signal to control the main power switching transistor to work in the on/off mode.

Preferably, the leakage protection module includes a leakage detection path and a comparator circuit; the leakage detection path includes a detection circuit and a detection switching transistor that are connected in series; the detection switching transistor is turned on or off according to an intermittent pulse signal; and the comparator circuit is configured to compare a node voltage on the detection path with a reference voltage to determine whether the input terminal has leakage, and generate the enable signal according to a comparison result.

Preferably, the leakage protection module starts to detect leakage of the input terminal after a supply voltage of the leakage protection module reaches a turn-on voltage; and the constant current controller starts to recognize the signal of the input terminal after a supply voltage of the constant current controller reaches a turn-on voltage.

According to a second aspect, the present disclosure provides an illumination device, including a rectifier module, a filter module, a power stage module, and further including the illumination driver circuit compatible with an electronic ballast and a mains supply, where the rectifier module is electrically connected to an input pin, and configured to receive an external power signal and rectify the external power signal to generate a direct current (DC) signal; the filter module is electrically connected to the rectifier module, and configured to receive the rectified DC signal and filter the rectified DC signal to generate a filtered signal; the power stage module is electrically connected to the filter circuit, and configured to receive the filtered signal and perform power conversion on the filtered signal, thereby generating an output signal to drive a load; the power stage module includes the main power switching transistor; and the illumination driver circuit is configured to detect the input signal of the input terminal to generate an on-off signal for controlling the main power switching transistor.

Preferably, the leakage protection module is connected to the input pin or an output terminal of the rectifier module to detect the input signal of the input terminal; and the constant current controller is connected to the input pin to detect the input signal of the input terminal.

Preferably, the input pin includes a first input pin and a second input pin; the first input pin and the second input pin are respectively provided at two ends of the illumination device; and the constant current controller is connected to a non-grounded potential terminal in the first input pin and the second input pin to detect the input signal of the input terminal.

Preferably, the input pin includes a first input pin, a second input pin, and a third input pin; the illumination device includes two ends; the first input pin and the second input pin are located at one end of the illumination device; the third input pin is located at the other end of the illumination device; and the constant current controller is connected to the third input pin to detect the input signal of the input terminal.

Preferably, the input pin includes a first input pin, a second input pin, a third input pin, and a fourth input pin; the illumination device includes two ends; the first input pin and the second input pin are located at one end of the illumination device; the third input pin and the fourth input pin are located at the other end of the illumination device; the constant current controller is connected to the third input pin or the fourth input pin to detect the input signal of the input terminal; and the pin connected to the constant current controller is a pin of a non-grounded potential terminal.

With the illumination driver circuit compatible with an electronic ballast and a mains supply, the constant current controller recognizes the mains supply and the electronic ballast by detecting a frequency of the signal of the input terminal. When the input terminal is the input of the mains supply, the constant current controller the main power switching transistor to work in the off mode or the on/off mode according to the leakage detection result of the leakage protection module. When the input terminal is the input of the electronic ballast, the constant current controller controls the main power switching transistor to work in the through mode. Through the solution in the present disclosure, the detection of the electronic ballast and the detection of the leakage protection module can be performed at the same time. According to the detection result, the constant current controller enters different working logics to control a working state of the power switching transistor. Without other switching transistors, the present disclosure optimizes the use of the power device maximally. The present disclosure can shorten the detection time with synchronous detection on the chip. Moreover, the present disclosure can make the leakage protection module and the constant current controller module integrated highly, thereby optimizing peripherals of the system maximally, and achieving the low cost and the small overall size.

DETAILED DESCRIPTION OF THE EMBODIMENTS

The preferred embodiments of the present disclosure are described in detail below with reference to the drawings, but the present disclosure is not limited to these embodiments. The present disclosure covers any substitution, modification, equivalent method and solution made within the spirit and scope of the present disclosure.

For a better understanding of the present disclosure, the specific details of the following preferred embodiments of the present disclosure are explained hereinafter in detail, while the present disclosure can also be fully understood by those skilled in the art without the description of these details.

The present disclosure is described in detail by giving examples with reference to the drawings. It should be noted that the drawings are simplified and do not use an accurate proportion, that is, the drawings are merely for the objectives of conveniently and clearly assisting in illustrating embodiments of the present disclosure.

Figure 1:
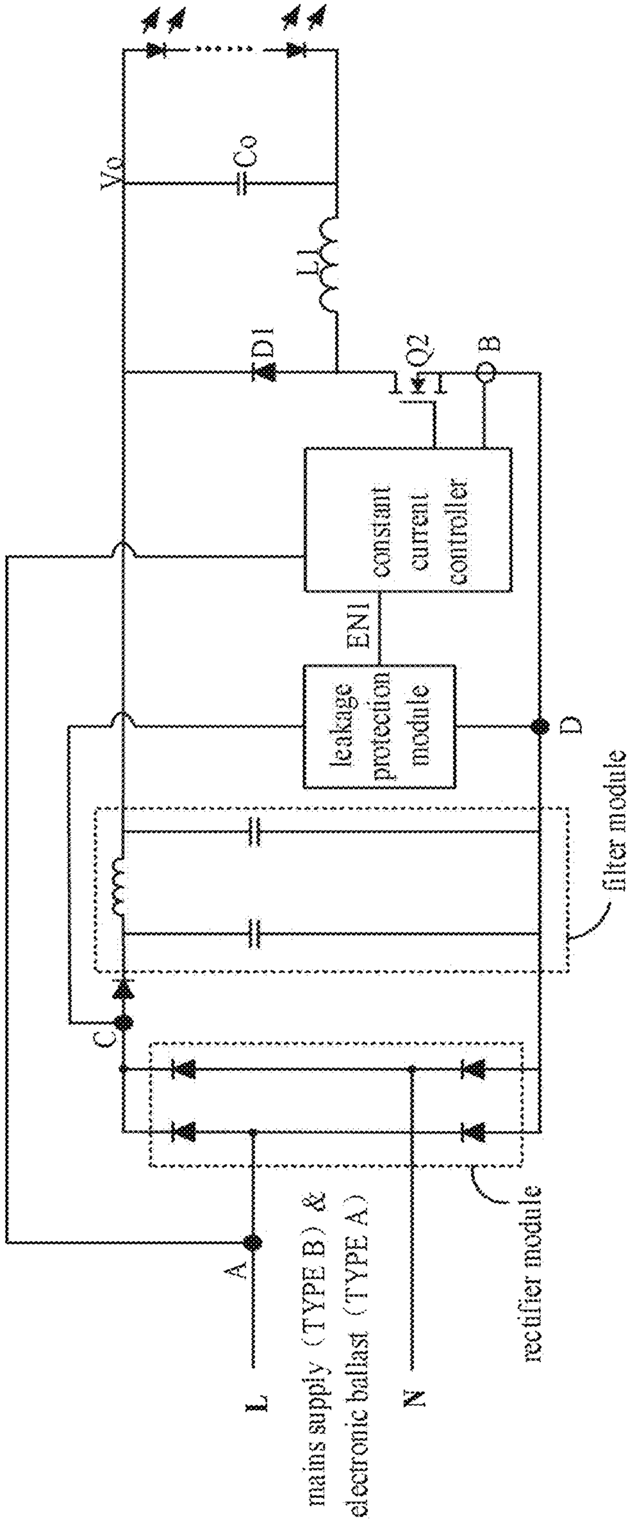
FIG. 1 is an electrical block diagram of an illumination driver circuit compatible with an electronic ballast and a mains supply according to a first embodiment of the present disclosure.
Figure 2:
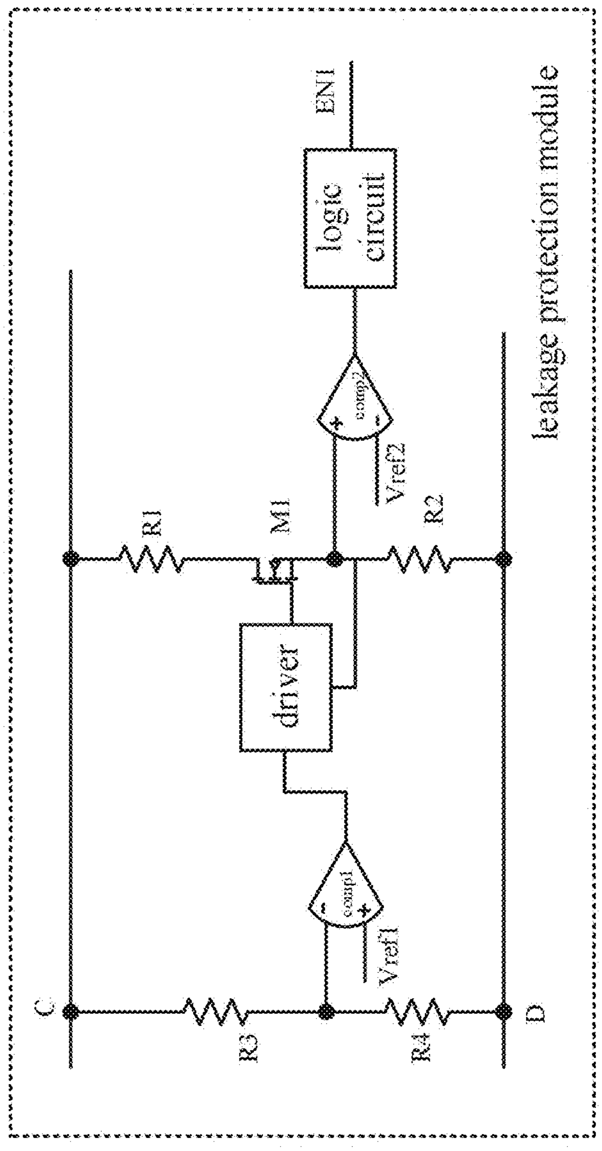
FIG. 2 is a circuit diagram of a leakage protection module in FIG. 1 according to the present disclosure.
Figure 3:
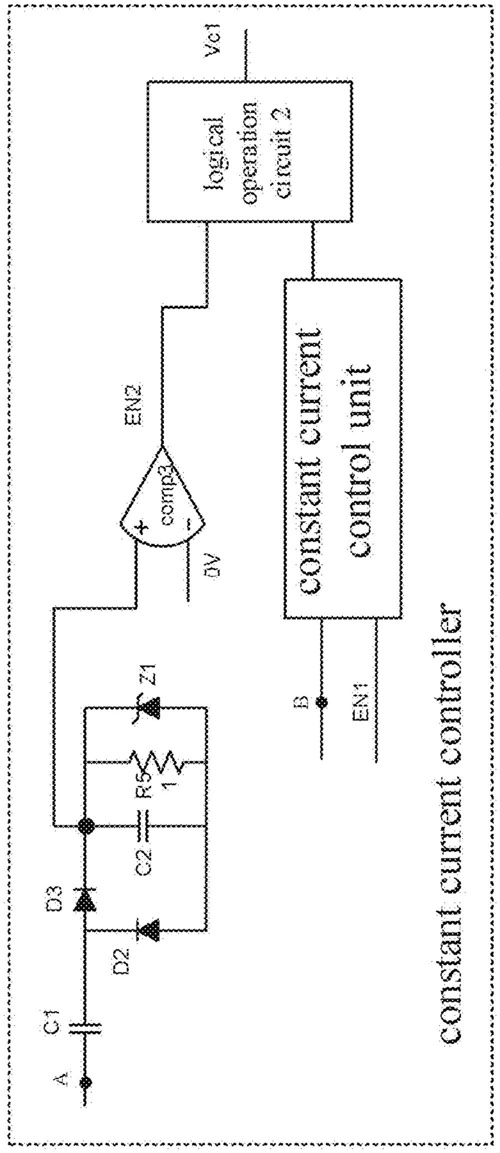
FIG. 3 is a circuit diagram of a constant current controller in FIG. 1 according to the present disclosure.

FIG. 1 is an electrical block diagram of an illumination driver circuit compatible with an electronic ballast and a mains supply according to a first embodiment of the present disclosure. FIG. 2 is a circuit diagram of a leakage protection module in FIG. 1 according to the present disclosure. FIG. 3 is a circuit diagram of a constant current controller in FIG. 1 according to the present disclosure. The illumination driver circuit provided by the present disclosure is applied to an illumination device. The illumination device is, for example, an LED illumination device. The illumination device includes a rectifier module, a filter module, and a power stage module. The rectifier module includes a full bridge rectifier circuit. The full bridge rectifier circuit is electrically connected to an input pin (such as the input pin L and the input pin N), and configured to receive an external power signal and rectify the external power signal to generate a DC signal. The filter module includes a filter capacitor and an inductor. The filter module is electrically connected to the rectifier module, and configured to receive the rectified DC signal and filter the rectified DC signal to generate a filtered signal. The power stage module is electrically connected to the filter circuit, and configured to receive the filtered signal and perform power conversion on the filtered signal, thereby generating an output signal, such as output voltage Vo, to drive a load (such as an LED). The power stage module includes, for example, main power switching transistor Q2, diode D1, inductor L1, and output capacitor C0, and is not limited thereto.

As shown in FIG. 1, the illumination driver circuit compatible with an electronic ballast and a mains supply in the embodiment includes a leakage protection module and a constant current controller. The leakage protection module is configured to detect a voltage signal of an input bus for leakage detection, and transmit enable signal EN1 representing a leakage detection result to the constant current controller. The constant current controller is configured to detect an input signal of an input terminal to recognize the mains supply or the electronic ballast. The constant current controller is configured to control an on-off state of the main power switching transistor Q2 according to a recognized result. Herein, the input signal of the input terminal is an input signal of an input terminal of the illumination device. It is either a low-frequency signal (which is 50 Hz or 60 Hz usually) of the mains supply or a high-frequency signal (which is 25 KHz to 125 KHz usually) of the electronic ballast. When the constant current controller detects that the input terminal is an input of the mains supply, the constant current controller controls the main power switching transistor Q2 to work in an off mode or an on/off mode according to the leakage detection result of the leakage protection module. When the input terminal is an input of the electronic ballast, the constant current controller does not enable the detection result of the leakage protection module, but constantly controls the main power switching transistor Q2 to work in a through mode. The main power switching transistor Q2 in the on/off mode controls the load to work at a constant current. Herein, when it is recognized that the input terminal is the input of the electronic ballast, a current of the load depends on the electronic ballast. In response to the input of the electronic ballast, leakage protection requirements do not need to be considered, and the constant current controller may not enable the detection result of the leakage protection module. Hence, the main power switching transistor Q2 is maintained at the through mode, and the current of the load is controlled by the electronic ballast.

Referring to FIG. 2, the leakage protection module includes a leakage detection path and a comparator circuit. The leakage detection path includes a detection circuit (such as resistor R1 and resistor R2) and a detection switching transistor (M1) that are connected in series. The detection switching transistor is turned on or off according to an intermittent pulse signal. The intermittent pulse signal may be obtained by allowing comparator comp1 to compare a detected voltage signal with reference signal Vref1, and may also be provided by a preset pulse signal generator. The comparator circuit is configured to compare a node voltage on the detection path with a reference voltage to determine whether the input terminal has leakage, and generate the enable signal according to a comparison result. Herein, when the switching transistor M1 is turned on, a detected current or a detected voltage signal can be obtained on the detection path. For example, the comparator cmp is used to compare a node voltage between the switching transistor M1 and the resistor R2 with reference voltage Vref2. If the node voltage is less than the reference voltage Vref2, the input terminal has the leakage (or a human body is connected). By this time, the enable signal EN1 output by a logical circuit is a low-level invalid state. If the node voltage is greater than the reference voltage Vref2, the input terminal does not have the leakage (or the human body is not connected). By this time, the enable signal ENI output by the logical circuit is a high-level valid state. Therefore, the leakage detection circuit can detect whether the input terminal has the leakage well, thereby ensuring safety of the user in case of the mains supply.

Further, referring to FIG. 3, the constant current controller includes a frequency detection circuit. The frequency detection circuit includes first capacitor C1, second capacitor C2, and comparator circuit comp3. The first capacitor includes one terminal connected to the input terminal, such as point A of the input terminal, and the other terminal configured to charge the second capacitor through rectifier diode D3. The comparator circuit is configured to compare a voltage magnitude of the second capacitor with a reference zero voltage. In response to the input of the mains supply, since the mains supply has a frequency of 50 Hz or 60 Hz, voltages at two terminals of the second capacitor C2 are not established for low-frequency obstruction of the first capacitor C1, the voltage magnitude of the second capacitor is zero, and the comparator circuit outputs a comparison signal (such as EN2) of a low-level invalid state. In response to the input of the electronic ballast, since the electronic ballast has a frequency of 25 KHz to 125 KHz, the first capacitor C1 falls in a high-frequency low-impedance state, the second capacitor C2 is charged by a current flowing through the first capacitor C1, the voltage magnitude of the second capacitor is greater than zero, and the comparator circuit outputs a comparison signal of a high-level valid state. As shown in FIG. 3, the frequency detection circuit includes a discharge circuit (such as resistor R5) and a clamping circuit (such as clamper tube Z1). The discharge circuit and the clamping circuit are connected to two terminals of the second capacitor in parallel. The clamping circuit is configured to clamp voltages at the two terminals of the second capacitor. When charged to a clamping voltage, the second capacitor C2 is clamped at the clamping voltage. Thereafter, the voltage of the second capacitor is a stabilized voltage of the Z1. The constant current controller controls the main power switching transistor Q2 to enter the through mode. Therefore, the signals at the input terminal are recognized according to different frequencies of the signals at the input terminal. The embodiment in FIG. 3 is merely a manner for recognizing the frequency, and other recognition manners may also be provided. Considering that frequencies of the two input signals are greatly different, a frequency may also be set directly for comparison, and the different input signals are distinguished through a threshold of the frequency. The diode D2 serves as a discharge loop of the first capacitor C1 in FIG. 3, so as to better protect components of the circuit, and not to damage the circuit.

Referring also to FIG. 3, the constant current controller further includes a constant current control unit. The constant current control unit is configured to receive a current feedback signal (such as a current signal at point B) and the enable signal EN1 of the leakage protection module, so as to generate an on-off control signal to control the main power switching transistor to work in different modes. When the input of the mains supply is recognized, a state of the main power switching transistor Q2 is further to be determined according to the leakage detection result. When the detection result of the leakage protection module shows the leakage, with the enable signal EN1 being the low-level invalid state, the main power switching transistor Q2 is controlled by the on-off control signal to work in the off mode. When the detection result of the leakage protection module does not show the leakage, with the enable signal EN1 being the high-level valid state, the constant current control unit generates another on-off control signal according to the current feedback signal to control the main power switching transistor Q2 to work in the on/off mode (namely a constant current mode). Herein, the output signal EN2 of the frequency detection circuit and the output signal of the constant current control unit are subjected to a logical operation through logical operation circuit 2, such that the main power switching transistor Q2 can work according to a working mode of the present disclosure in different conditions. With one switching transistor, the circuit compatible with the mains supply and the electronic ballast can be realized, and the leakage protection in case of the mains supply can be realized.

Preferably, in leakage detection of the leakage protection module and recognition of the constant current controller on the input signal, after the input terminal receives an external signal, the leakage protection module starts to detect leakage of the input terminal after a supply voltage of the leakage protection module reaches a turn-on voltage. The constant current controller starts to recognize the signal of the input terminal after a supply voltage of the constant current controller reaches a turn-on voltage. The two modules may include a simultaneous process or an alternative process, without waiting for the detection result from each other. This can greatly shorten the detection time. Meanwhile, according to the detection result, the working state of the main power switching transistor Q2 can be controlled. That is, the function of the main power switching transistor Q2 is multiplexed, the use of the power device is optimized maximally, and other switching devices do not need additionally.

In the embodiment shown in FIG. 1, the leakage protection module is connected to two output terminals (such as point C and point D) of the rectifier circuit. Through other electrical signals of the input bus, the leakage can also be detected. For example, the input signal of the input terminal can be detected at the input pin (L and N) or the output terminal of the rectifier module. Herein, the input pin includes a first input pin and a second input pin respectively provided at two ends of the illumination device. The first input pin is electrically connected to line L of a double-ended input. The second input pin is electrically connected to line N of the double-ended input. The input terminal can be compatible with the input of the mains supply and the input of the electronic ballast. In this case, the constant current controller is connected to a non-grounded potential terminal (such as the point A) in the first input pin and the second input pin to detect the input signal of the input terminal.

Figure 4:
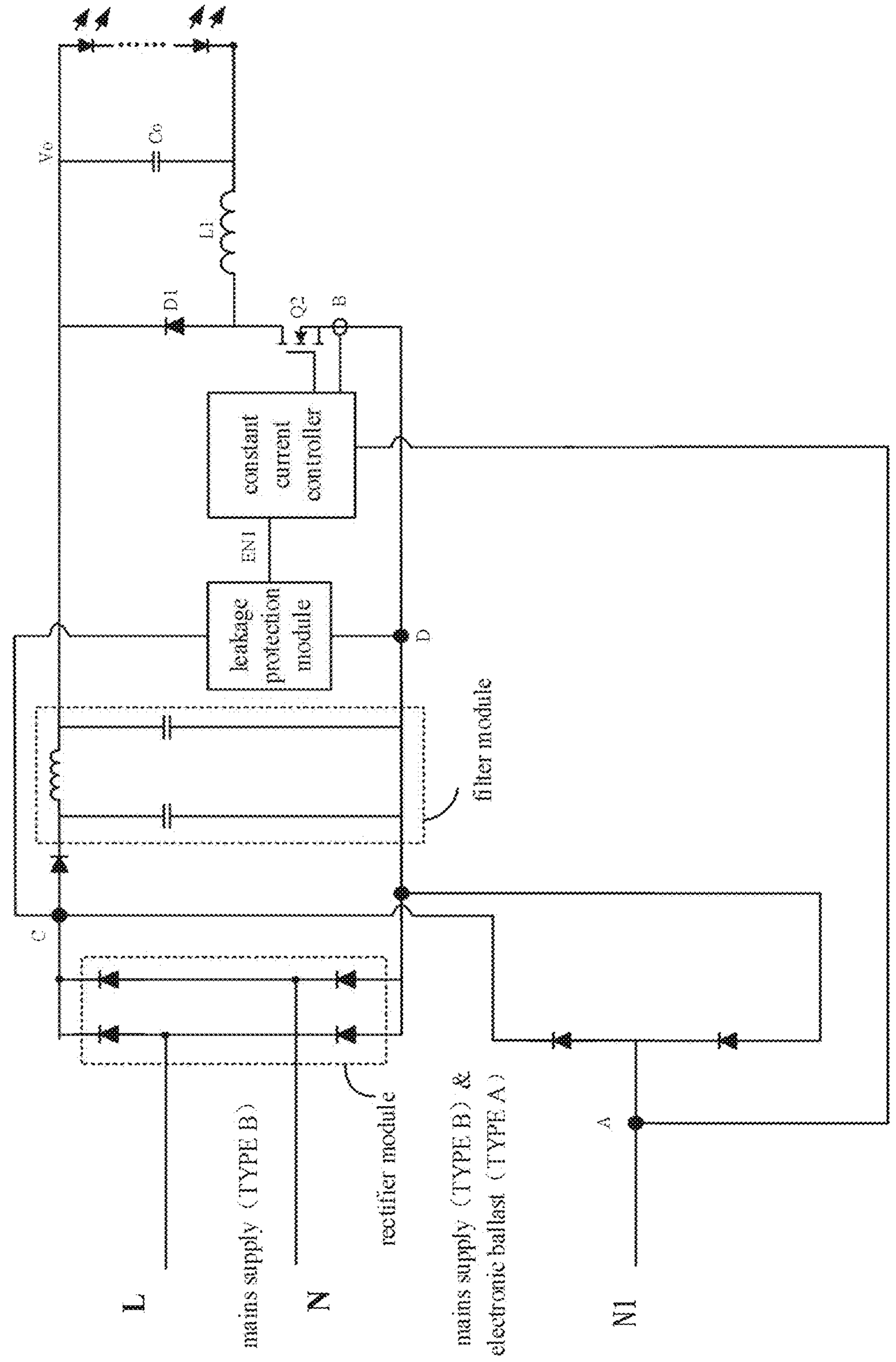
FIG. 4 is an electrical block diagram of an illumination driver circuit compatible with an electronic ballast and a mains supply according to a second embodiment of the present disclosure.

FIG. 4 is an electrical block diagram of an illumination driver circuit compatible with an electronic ballast and a mains supply according to a second embodiment of the present disclosure. The illumination device, the leakage protection module and the constant current controller in the embodiment are the same as those in the embodiment shown in FIG. 1. The illumination device in the embodiment includes two ends. The input pin includes a first input pin, a second input pin, and a third input pin. The first input pin and the second input pin are located at one end of the illumination device, and the third input pin is located at the other end of the illumination device. The third input pin is configured to connect line L or line N of an input. The input of the mains supply and the input of the electronic ballast can be compatible between the first input pin and the third input pin or between the second input pin and the third input pin. In this case, the constant current controller is connected to the third input pin to detect the input signal of the input terminal. The illumination driver circuit in the embodiment can be applied to various application occasions.

Figure 5:
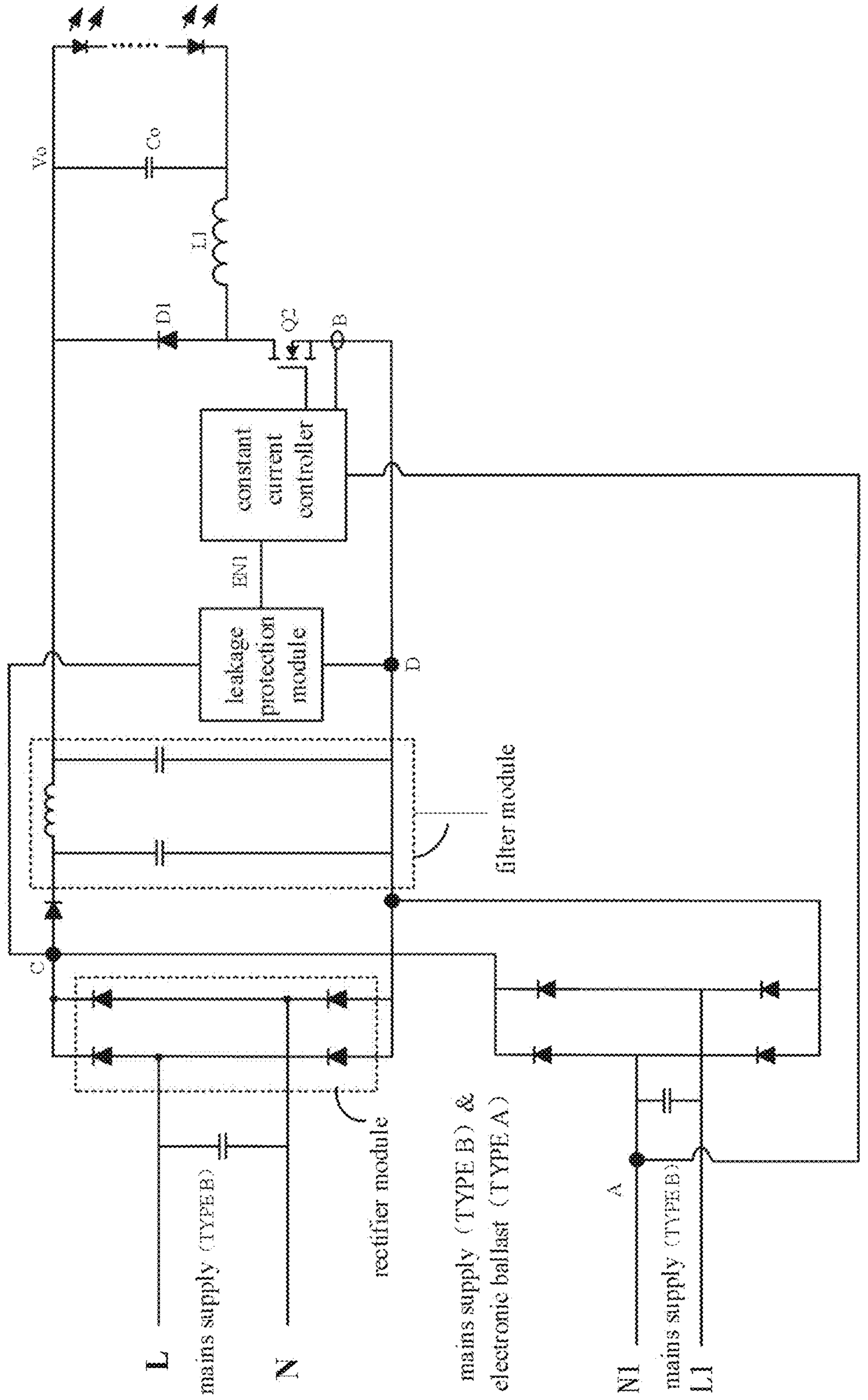
FIG. 5 is an electrical block diagram of an illumination driver circuit compatible with an electronic ballast and a mains supply according to a third embodiment of the present disclosure.

FIG. 5 is an electrical block diagram of an illumination driver circuit compatible with an electronic ballast and a mains supply according to a third embodiment of the present disclosure. The illumination device, the leakage protection module and the constant current controller in the embodiment are the same as those in the embodiment shown in FIG. 1. The input pin in the embodiment includes a first input pin, a second input pin, a third input pin, and a fourth input pin. The illumination device includes two ends. The first input pin and the second input pin are located at one end of the illumination device, and the third input pin and the fourth input pin are located at the other end of the illumination device. The input of the mains supply and the input of the electronic ballast can be compatible between the first input pin and either of the third input pin and the fourth input pin or between the second input pin and either of the third input pin and the fourth input pin. In this case, the constant current controller is connected to a non-grounded potential terminal in the third input pin or the fourth input pin to detect the input signal of the input terminal. The illumination driver circuit in the embodiment can be applied to various application occasions.

The illumination driver circuit and the illumination apparatus provided by the present disclosure can realize the leakage detection and the recognition of the input signal well, and have the simple circuit structure and the wide application range.

It should be additionally noted that the provided specific implementation and corresponding legends are only one way to describe the implementation method of the present disclosure, and do not limit a specific structure of the implementation solution of the present disclosure. Various changes or modifications can be made to these implementations without departing from the principle and essence of the present disclosure, but all these changes and modifications shall fall within the protection scope of the present disclosure.

Although the embodiments are separately illustrated and described above, the embodiments contain some common technologies. Those skilled in the art can replace and integrate the embodiments. Any content not clearly recorded in one of the embodiments may be determined based on another embodiment where the content is recorded.

The implementations described above do not constitute a limitation on the protection scope of the technical solution of the present disclosure. Any modification, equivalent replacement, and improvement made in the spirit and principle of the above implementations should fall in the protection scope of the technical solution of the present disclosure.

The invention claimed is:

1. An illumination driver circuit compatible with an electronic ballast and a mains supply, comprising a leakage protection module and a constant current controller, wherein the constant current controller is configured to control an on-off state of a main power switching transistor;

the leakage protection module is configured to detect a voltage signal of an input bus for leakage detection, and transmit an enable signal representing a leakage detection result to the constant current controller;

the constant current controller is configured to detect an input signal of an input terminal to recognize the mains supply or the electronic ballast; and when the constant current controller detects that the input terminal is an input of the mains supply, the constant current controller controls the main power switching transistor to work in an off mode or an on/off mode according to the leakage detection result of the leakage protection module; and when the input terminal is an input of the electronic ballast, the constant current controller controls the main power switching transistor to work in a through mode, wherein the constant current controller is configured to recognize, according to a frequency of the input signal of the input terminal, whether the input terminal is the input of the mains supply or the input of the electronic ballast, wherein the constant current controller further comprises a constant current control unit, and wherein the constant current control unit is configured to receive a current feedback signal and the enable signal of the leakage protection module, and generate an on-off control signal to control the main power switching transistor to work in different modes.

2. The illumination driver circuit compatible with the electronic ballast and the mains supply according to claim 1, wherein the leakage protection module is configured to output an enable signal of a high-level valid state to the constant current controller when no current leakage is detected, and output an enable signal of a low-level invalid state to the constant current controller when a current leakage is detected.

3. The illumination driver circuit compatible with the electronic ballast and the mains supply according to claim 1, wherein when the input of the electronic ballast is recognized, the main power switching transistor is controlled by the on-off control signal to work in the through mode.

4. The illumination driver circuit compatible with the electronic ballast and the mains supply according to claim 1, wherein when the input of the mains supply is recognized, and when the enable signal of the leakage protection module is a low-level invalid state, the main power switching transistor is controlled by the on-off control signal to work in the off mode; and when the enable signal of the leakage protection module is a high-level valid state, the constant current control unit generates the on-off control signal according to the current feedback signal to control the main power switching transistor to work in the on/off mode.

5. The illumination driver circuit compatible with the electronic ballast and the mains supply according to claim 1, wherein the leakage protection module comprises a leakage detection path and a comparator circuit;

the leakage detection path comprises a detection circuit and a detection switching transistor, wherein the detection circuit and the detection switching transistor are connected in series; and the detection switching transistor is turned on or off according to an intermittent pulse signal; and the comparator circuit is configured to compare a node voltage on the detection path with a reference voltage to determine whether the input terminal has a current leakage, and generate the enable signal according to a comparison result.

6. The illumination driver circuit compatible with the electronic ballast and the mains supply according to claim 1, wherein the leakage protection module starts leakage detection on the input terminal after a supply voltage of the leakage protection module reaches a first turn-on voltage; and the constant current controller starts to recognize the input signal of the input terminal after a supply voltage of the constant current controller reaches a second turn-on voltage.

7. An illumination driver circuit compatible with an electronic ballast and a mains supply, comprising a leakage protection module and a constant current controller, wherein the constant current controller is configured to control an on-off state of a main power switching transistor;

the leakage protection module is configured to detect a voltage signal of an input bus for leakage detection, and transmit an enable signal representing a leakage detection result to the constant current controller:

the constant current controller is configured to detect an input signal of an input terminal to recognize the mains supply or the electronic ballast; and when the constant current controller detects that the input terminal is an input of the mains supply, the constant current controller controls the main power switching transistor to work in an off mode or an on/off mode according to the leakage detection result of the leakage protection module; and when the input terminal is an input of the electronic ballast, the constant current controller controls the main power switching transistor to work in a through mode, wherein the constant current controller is configured to recognize, according to a frequency of the input signal of the input terminal, whether the input terminal is the input of the mains supply or the input of the electronic ballast, and wherein the constant current controller comprises a frequency detection circuit;

the frequency detection circuit comprises a first capacitor, a second capacitor, and a comparator circuit; the first capacitor comprises a first terminal connected to the input terminal, and a second terminal configured to charge the second capacitor through a rectifier diode; the comparator circuit is configured to compare a voltage magnitude of the second capacitor with a reference voltage; and the reference voltage is a zero voltage or near the zero voltage;

in response to the input of the mains supply, the voltage magnitude of the second capacitor is zero, and the comparator circuit outputs a comparison signal of a low-level invalid state; and in response to the input of the electronic ballast, the voltage magnitude of the second capacitor is greater than zero, and the comparator circuit outputs a comparison signal of a high-level valid state.

8. The illumination driver circuit compatible with the electronic ballast and the mains supply according to claim 7, wherein the frequency detection circuit comprises a discharge circuit and a clamping circuit; and the discharge circuit and the clamping circuit are connected to two terminals of the second capacitor in parallel; and the clamping circuit is configured to clamp voltages at the two terminals of the second capacitor.

9. An illumination device, comprising a rectifier module, a filter module, and a power stage module, and further comprising an illumination driver circuit compatible with an electronic ballast and a mains supply, wherein the illumination driver circuit compatible with the electronic ballast and the mains supply comprises a leakage protection module and a constant current controller, wherein the constant current controller is configured to control an on-off state of a main power switching transistor;

the leakage protection module is configured to detect a voltage signal of an input bus for leakage detection, and transmit an enable signal representing a leakage detection result to the constant current controller;

the constant current controller is configured to detect an input signal of an input terminal to recognize the mains supply or the electronic ballast;

when the constant current controller detects that the input terminal is an input of the mains supply the constant current controller controls the main power switching transistor to work in an off mode or an on/off mode according to the leakage detection result of the leakage protection module; and when the input terminal is an input of the electronic ballast, the constant current controller controls the main power switching transistor to work in a through mode;

the rectifier module is electrically connected to an input pin, and configured to receive an external power signal and rectify the external power signal to generate a direct current (DC) signal;

the filter module is electrically connected to the rectifier module, and configured to receive the DC signal and filter the DC signal to generate a filtered signal;

the power stage module is electrically connected to the filter circuit, and configured to receive the filtered signal and perform power conversion on the filtered signal, thereby generating an output signal to drive a load; and the power stage module comprises the main power switching transistor; and the illumination driver circuit is configured to detect the input signal of the input terminal to generate an on-off signal for controlling the main power switching transistor.

10. The illumination device according to claim 9, wherein the leakage protection module is connected to the input pin or an output terminal of the rectifier module to detect the input signal of the input terminal; and the constant current controller is connected to the input pin to detect the input signal of the input terminal.

11. The illumination device according to claim 10, wherein the input pin comprises a first input pin and a second input pin; and the first input pin and the second input pin are respectively provided at two ends of the illumination device; and the constant current controller is connected to a non-grounded potential terminal in the first input pin and the second input pin to detect the input signal of the input terminal.

12. The illumination device according to claim 10, wherein the input pin comprises a first input pin, a second input pin, and a third input pin; and the illumination device comprises a first end and a second end;

the first input pin and the second input pin are located at the first end of the illumination device; and the third input pin is located at the second end of the illumination device; and the constant current controller is connected to the third input pin to detect the input signal of the input terminal.

13. The illumination device according to claim 10, wherein the input pin comprises a first input pin, a second input pin, a third input pin, and a fourth input pin; and the illumination device comprises a first end and a second end;

the first input pin and the second input pin are located at the first end of the illumination device; and the third input pin and the fourth input pin are located at the second end of the illumination device; and the constant current controller is connected to the third input pin or the fourth input pin to detect the input signal of the input terminal; and the third input pin or the fourth input pin connected to the constant current controller is a pin of a non-grounded potential terminal.

14. The illumination device according to claim 9, wherein the leakage protection module is configured to output an enable signal of a high-level valid state to the constant current controller when no current leakage is detected, and output an enable signal of a low-level invalid state to the constant current controller when a current leakage is detected.

15. The illumination device according to claim 9, wherein the constant current controller is configured to recognize, according to a frequency of the input signal of the input terminal, whether the input terminal is the input of the mains supply or the input of the electronic ballast.

16. The illumination device according to claim 15, wherein the constant current controller comprises a frequency detection circuit;

the frequency detection circuit comprises a first capacitor, a second capacitor, and a comparator circuit; the first capacitor comprises a first terminal connected to the input terminal, and a second terminal configured to charge the second capacitor through a rectifier diode; the comparator circuit is configured to compare a voltage magnitude of the second capacitor with a reference voltage; and the reference voltage is a zero voltage or near the zero voltage;

in response to the input of the mains supply, the voltage magnitude of the second capacitor is zero, and the comparator circuit outputs a comparison signal of a low-level invalid state; and in response to the input of the electronic ballast, the voltage magnitude of the second capacitor is greater than zero, and the comparator circuit outputs a comparison signal of a high-level valid state.

17. The illumination device according to claim 16, wherein the frequency detection circuit comprises a discharge circuit and a clamping circuit; and the discharge circuit and the clamping circuit are connected to two terminals of the second capacitor in parallel; and the clamping circuit is configured to clamp voltages at the two terminals of the second capacitor.

18. The illumination device according to claim 15, wherein the constant current controller further comprises a constant current control unit; and the constant current control unit is configured to receive a current feedback signal and the enable signal of the leakage protection module, and generate an on-off control signal to control the main power switching transistor to work in different modes.

* * * * *